United States Patent [19]

Zaydel

[11] 4,137,959

[45] Feb. 6, 1979

[54] SELF-LOCKING KNOB AND STUD ASSEMBLY

[75] Inventor: Wieslaw S. Zaydel, Rochester, Mich.

[73] Assignee: General Motors Corporation, Detroit, Mich.

[21] Appl. No.: 851,276

[22] Filed: Nov. 14, 1977

[51] Int. Cl.² ............................................. F16B 39/00
[52] U.S. Cl. ........................................ 151/27; 151/6; 151/11
[58] Field of Search .................. 85/45, 61, 62; 151/6, 151/10, 11, 25 A, 27, 28, 29, 30

[56] References Cited

U.S. PATENT DOCUMENTS

| 613,035 | 10/1898 | Hannaford | 151/6 |
| 864,706 | 8/1907 | Smith | 151/25 A |
| 1,070,125 | 8/1913 | Faith | 151/11 |
| 1,070,844 | 8/1913 | Roe | 151/11 |
| 2,074,084 | 3/1937 | Ellestad | 151/30 X |
| 2,398,827 | 4/1946 | Graham et al. | 151/11 |
| 3,464,474 | 9/1969 | Jansen | 151/28 X |

FOREIGN PATENT DOCUMENTS

| 260317 | 9/1928 | Italy | 151/28 |
| 5865 of | 1894 | United Kingdom | 151/10 |
| 574782 | 1/1946 | United Kingdom | 151/28 |

Primary Examiner—Lawrence J. Staab
Attorney, Agent, or Firm—Arthur N. Krein

[57] ABSTRACT

A self-locking knob and stud assembly includes a self-locking knob consisting of an internally threaded knob with an apertured spring retainer clip slidably received in a transverse slot provided in the knob, the aperture through the retainer clip being operative to effect a locking action of the knob relative to a stud on which the knob is threaded when rotated in one direction. The stud which is of special configuration has a reduced diameter Z-shaped free end shank portion that extends axially outward for the externally threaded portion of the stud. The aperture through the retainer clip is defined by a semi-circular rim edge at one end thereof to define an opening of a diameter so as to slidably and rotatably receive the Z-shaped free end shank portion of the stud and the aperture is defined at its other end by an edge means including a cam tab means positioned to normally be in the path of the Z-shaped shank portion during rotation of the knob relative thereto, the retainer clip further including a return bent spring portion abutting against the exterior of the knob to normally bias the retainer clip in a direction whereby the cam tab edge means is positioned to be in interference relationship with the Z-shaped free end shank portion of the stud upon rotation of the knob relative thereto.

3 Claims, 4 Drawing Figures

U.S. Patent  Feb. 6, 1979  4,137,959
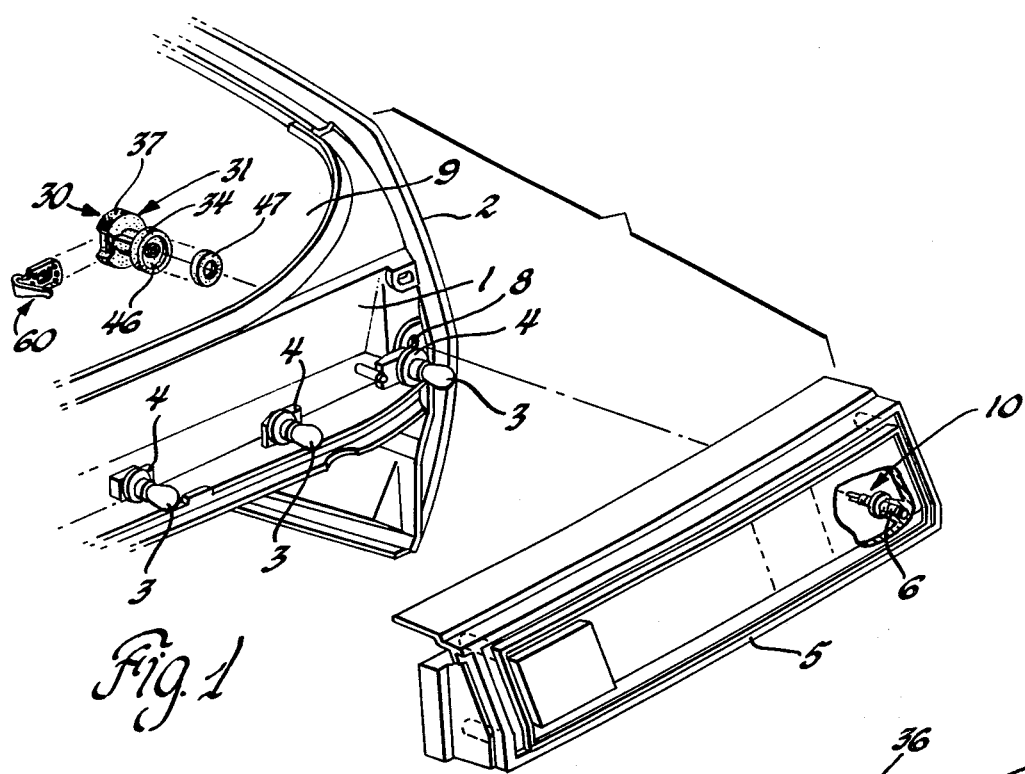
Fig. 1
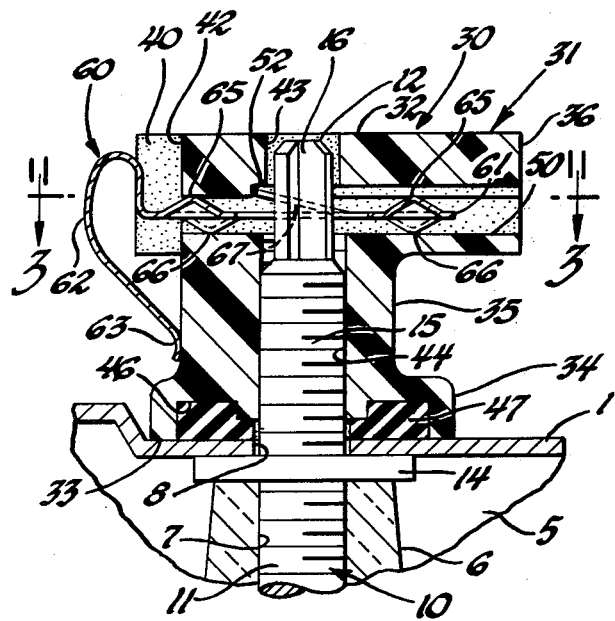
Fig. 3
Fig. 4

SELF-LOCKING KNOB AND STUD ASSEMBLY

This invention relates to threaded fasteners and, in particular, to the self-locking knob and stud assembly.

FIELD OF THE INVENTION

In the manufacture of various products, it is often necessary to attach members or sub-assemblies to each other or to a support member by the use of suitable fasteners whereby these elements can later be disassembled and then reassembled to effect maintenance or repair. For example, the exterior rear lamps and back-up lamps in certain present day automotive vehicles have their respective lamp sockets, with associated wiring, fixed to the lower rear panel portion of the vehicle body in such a manner that groups or sets thereof may be enclosed by a suitable lamp housing that supports the usual lense and optical system for the lamps.

One method for the retention of such a lamp housing is by means of studs and nuts, the studs being fixed to the lamp housing such that a threaded shank portion of the stud projects therefrom to extend through a suitable aperture in the rear panel member of the vehicle body into the rear compartment of the vehicle in position to receive the nuts whereby these elements can be secured together. It will thus be apparent that for disassembly, the nuts are likewise accessible from the open rear compartment of the vehicle.

In such an assembly as described above, the desirability of preventing the nut from backing off of the stud after assembly has been recognized since, as the nuts back off, some separation of the lamp housing from the vehicle body will occur thus permitting water to leak therebetween and down around and onto the electric lamp components. Although various forms of nut lock arrangements are known from the prior art that will be operative to prevent such backing off of a nut from its associated stud, it is deemed desirable to have a nut lock arrangement for this type application that is provided with a positive lock action but which can be readily manipulated by the average vehicle owner so that the owner may service the lamp assembly of his vehicle without the aid of any special tools.

SUMMARY OF THE INVENTION

The present invention provides a self-locking knob and stud assembly for use, for example, on an automotive vehicle whereby the vehicle owner can manually effect the disassembly and reassembly of various components of the vehicle without the necessity of any special tool. To this end, the self-locking knob and stud assembly of the invention, used for securing first and second members togeter, includes a threaded fastener suitably secured to the second member and having a threaded shank projecting through an aperture in the first member, the shank including a reduced diameter free end portion of Z-shape in cross section so as to provide flat chord lock segments and return cam segments thereon. A knob, in the form of a nut, is threaded on the threaded shank portion of the fastener to secure the first and second members together, the knob having a transverse slot therein to receive a spring biased retainer clip having an aperture therethrough, this aperture being defined by a semi-circular rim edge to partly define an opening of a diameter so as to slidably and rotatably receive the free end shank portion of the fastener and by an edge means including a cam tab edge means, that is normally positioned to be in the path of rotation of the stud relative to the knob whereby to engage with a flat chord lock segment or a radial cam segment of the fastener depending on whether the knob is rotated in a backing off or torquing down direction, respectively, relative to the fastener.

Accordingly, it is the primary object of this invention to provide an improved fastener assembly whereby to secure two members together by an externally threaded fastener and associated self-locking knob threaded thereon.

Another object of this invention is to provide an improved self-locking knob and stud assembly which can be readily assembled and disassembled without the need of any tool.

For a better understanding of the invention as well as other objects and further features thereof, reference is had to the following description of the invention to be read in connection with the accompanying drawings.

BRIEF DESCRIPTION OF THE DRAWINGS

FIG. 1 is an exploded perspective view of a portion of the right rear end of a vehicle body having a lamp housing to be attached to the vehicle body by means of a self-locking knob and stud assembly in accordance with the invention;

FIG. 2 is a sectional view of a portion of the completed assembly of the self-locking knob and stud assembly of the invention as used to secure the lamp housing to the vehicle body of FIG. 1;

FIG. 3 is a sectional view of the self-locking knob and stud assembly, taken along line 3—3 of FIG. 2; and, FIG. 4 is a perspective view of the retainer clip, per se, of the self-locking knob.

DESCRIPTION OF THE PREFERRED EMBODIMENT

Referring first to FIG. 1, there is shown, for purpose of illustration only, a particular portion of a vehicle assembly having incorporated therein a self-locking knob and stud assembly in accordance with the invention. As shown, the rear panel member of a vehcile body 2, only the right rear of which is shown, has the various rear lamps 3 of the vehicle, received in suitable electrical sockets 4 fixed to the rear panel member, the sockets 4 being connected by suitable wires, not shown, in a conventional manner to the electrical system, also not shown, of the vehicle. The lamps 3 of the right hand set of lamps are normally enclosed by a member or lamp housing 5, supporting the usual lense and optical elements for the lamps, that is provided with a plurality of spaced apart bosses 6 extending from its internal side. Each of the bosses 6 has a fastener in the form of a stud 10 fixed thereto as by having one threaded shank end 11 of each stud threadedly received in a corresponding threaded aperture 7 in each boss, four such studs being used in the construction illustrated. Each stud 10 at its opposite end has a shank portion 12 that extends outward from the lamp housing 5 for passage through suitable apertures 8 provided for this purpose in the rear panel member 1 so that the ends thereof are accessible within the rear compartment 9 so as to each receive a self-locking knob, generally designated 30, constructed in accordance with the invention, each such self-locking knob 30, only one of which is shown, including a knob 31 threaded onto the stud 10 and a retainer clip 60 that is slidable within the knob 31 to effect locking engagement with the stud 10 in a manner to be described.

Referring now to FIGS. 2 and 3, the stud 10, in the construction illustrated, has an intermediate annular flange 14 separating the shank portions 11 and 12, the flange 14 being positioned to abut against the free end of the boss 6 when the shank 11 thereof is fully threaded into the threaded aperture 7 in the boss, whereby the flange 14 serves as a load bearing support that is sandwiched between the boss 6 of the lamp housing 5 and the rear panel member 1 when these elements are assembled together. Shank 12 includes an externally threaded shank portion 15, of predetermined axial length, next adjacent to and upstanding from flange 14 and a free end shank portion 16, also of predetermined axial length, which when viewed in cross section, as seen in FIG. 3, is substantially Z-shaped. As shown, this Z-shape is provided by having the free end shank portion 16 notched on opposite sides thereof so as to provide on each side thereof a flat chord lock segment 17 connected to a radial cam segment 18. As shown, the free end of the radial cam segment 18 on one side of the shank portion 16 is connected to the free end of the flat chork lock segment on the opposite side by an outer peripheral arcuate segment 20 the outside diameter of the free shank portion 16, as measured between the arcuate segment 20, being preferably of reduced size relative to the outside diameter of the threaded shank portion 15.

Referring now to the self-locking knob 30, the knob 31 of this assembly may take any suitable external configuration, in the construction shown, is substantially a round knob having opposed upper and lower surfaces 32 and 33, respectively, with a lower annular outer surface 34 extending from the surface 33, and intermediate reduced diameter annular outer surface 35 and an upper enlarged diameter substantially annular outer surface or knob portion 36. The outer surface of this knob portion 36 is preferably as shown at 37. Knob portion 36 is provided on one side thereof with an axially extending slot providing opposed surfaces 40 and 41 and an interconnecting inner flat surface 42, all for a purpose to be described.

The body of knob 31 is provided with an axial bore therethrough, this bore in the construction illustrated is, in effect a stepped bore and includes an upper bore portion 43 extending from the upper surface 32, with reference to FIG. 2, and an internally threaded lower portion or bore 44 extending from the opposite side of the knob body, the size of threaded bore 44 corresponding to the externally threaded shank portion 15 of stud 10 whereby this knob can be threadedly received on the stud. The body of the knob is also provided with a counter bore 46 extending from the lower surfce 33 thereof which is formed concentric with the bores 43 and 44, this counter bore being of a size and shape to receive a washer like seal 47.

As best seen in FIG. 2, bore 43 may be of the same or of reduced diameter relative to threaded bore 44 but it is of a size so as to lossely, slidably and rotatably receive the free end shank portion 16 of stud 10. For example, in the construction illustrated, for ease in manufacturing, the knob 31 is formed initially with a straight through bore having an inside diameter corresponding substantially to the minor diameter of the external threads of the threaded shank portion 15 and then the bore is threaded from the surface 33 end thereof for a predetermined axial extent to provide the bore 44 with internal threads having a major diameter corresponding to the major diameter of the external threads of threaded shank portion 15.

The body of knob 31 at its upper end, with reference to FIG. 2, is provided with a transverse through stepped slot 50 that extends from the surface 42 to run out at the diametrically opposite side of the knob portion 37, this slot extending at right angle to the axis of bore 43 and intersects this bore next adjacent to the threaded bore 44. Slot 50 is of substantially rectangular cross section at the surface 42 end thereof, as seen in FIG. 2, and is of somewhat L-shape at its other end whereby to provide a groove slot 51 and a stop wall 52 on one side within the slot at a predetermined distance from the surface 42 end thereof for a purpose to be described. The transverse width and height of the slot 50 is preselected so as to properly receive the retainer clip 60, to be described hereinafter, and the extent between the opposed surfaces 40 and 41, defining a portion of the slot in the knob portion 36, is substantially greater than the width of this retainer clip 60.

A preferred embodiment of the retainer clip 60 made, for example, of spring steel is shown in its free form in FIG. 4 and includes a retainer body 61 of substantially rectangular configuration that terminates at one end integral with a return bent spring portion 62 that projects upward from retainer body 61 and then back down and inward to terminate at a free end 63. A longitudinal extending through slot opening is provided in the retainer body 61 and is defined by a continuous rim edge that includes a semi-circular edge 64a at the spring portion 62 end of the retainer body so as to partly outline an opening of a width preferably corresponding to the inside diameter of the bore portion 43 of knob 31, this width being at least greater than the maximum outside diameter of the Z-shaped free end shank portion 16 of stud 10 to in effect provide a free turning opening for this shank portion 16, an opposite end edge means 64b that includes a detent or cam tab means 64c of a size and shape to define an opening having a width less than the maximum outside diameter of the Z-shaped free end shank portion 16, and by interconnecting side rim edges 64d and 64e. The edge means 64b, including the cam tab means 64c, in effect provides an opening having a limited width for freely receiving the free end shank portion 16 of stud 10 only when this shank portion 16 is rotatably aligned with this opening in substantially the position shown in FIG. 3. As shown, the cam tab means 64c is somewhat L-shaped at its end facing the edge 64a to, in effect, act as a detent or pawl and, it will thus now be apparent that the Z-shape of the free end shank portion 16 will, in effect, act somewhat like a ratchet wheel, for a purpose to be described.

In addition, the retainer body 61 is deformed at opposite ends to provide sets of raised and depressed spherical buttons 65 and 66, respectively, whereby to provide reduced area sliding surfaces by which the retainer body is slidably supported within the slot 50 in knob 31. Preferably, the retainer body 61 is also pierced on at least one side thereof, the side corresponding to stop wall 52 side of slot 50, to provide an extended spring finger 67 to permit unit assembly of the retainer clip 60 and knob 31.

In assembling the retainer clip 60 to knob 31, the free end of the retainer body 61 is inserted into the slot 50 from the surface 42 end of this slot with the curved free end 63 of the return bent spring portion 62 positioned to engage the intermediate portion of knob 31 and it is the pushed inward sufficiently by bending of spring portion 62 so that the free edge of the spring finger 67 which has been depressed during insertion to move past the stop wall 52 to thus permit it to flex outward, and thereafter releasing the retainer clip whereby the free end of spring finger 67 will engage the stop wall 52 to thereby lock the retainer clip in the slot 50 of knob 31 against movement in one direction, to the left with reference to FIG. 2, whereby the knob 31 and retainer clip 60 are then a unit assembly.

As best seen in FIG. 2, the longitudinal position of the stop wall 52 in slot 50 and the location of the free end of spring finger 67 on retainer body 61 are preselected so that with the retainer clip 60 locked into the slot 50 of knob 31, as described above, the cam tab means 64c of the retainer body 61 will be positioned to intersect the bore 43 in knob 31, as shown in FIG. 3, a position at which the cam tab means 64c will be in the path of the free end shank portion 16 of stud 10 during rotation of knob 31 relative to this stud.

With this arrangement, assuming that knob 31 has been sufficiently threaded onto shank portion 12 of stud 10 by rotation of the knob in a torque down direction, clockwise direction of rotation with reference to FIG. 3, so that the free end of free end shank portion 16 will come into interference engagement with the cam tab means 64c, upon further clockwise rotation of knob 31, a cam segment 18 of the stud 10 will engage the cam tab means 64c to cause the retainer body 61 to ratchet or move inward further into the cavity 50, to the right with reference to FIGS. 2 and 3, against the bias of spring portion 62 so as to bring the opening partly defined by edge 64a into sufficient axial alignment with bore 43 to allow further rotation of knob 31 relative to stud 10. As the retainer body 61 thus slides in slot 50, the free end shank portion 16 of stud 10 clears the cam tab means 64c allowing rotation of knob 31 and, thereafter, the retainer body 61 again returns to its original position shown by the biasing action of spring portion 62. This ratcheting of retainer body 61 will continue during further clockwise rotation of knob 31 to permit manual torquing down of the knob 31 on stud 10 so that the operator can tightly secure lamp housing 5 to panel member 1, with the seal 46 sandwiched between the body of knob 31 and panel member 1.

However, upon attempted rotation of the knob 31 in the opposite direction, a counterclockwise direction with reference to FIG. 3, as the cam tab means 64c comes into engagement with a lock segment 17 of stud 10, the rotation is stopped because the retainer body 61 is then forced against a side wall defining the slot 50 in knob 31 thereby preventing longitudinal movement of the retainer body 61 in slot 50, thus providing the self-locking feature of the subject self-locking knob and stud assembly.

To unscrew the knob 31 from stud 10, the operator need merely apply pressure to the spring portion 62 of the retainer clip 60 in a direction, to the right with reference to FIGS. 2 and 3, to effect movement of the retainer body 61 within the slot 50 of knob 31 so that cam tab means 64c will be moved out of interference relationship with the free end shank portion 16 of stud 10 to thereby permit free manual rotation of the knob 31 off of stud 10.

What is claimed is:

1. A self-locking knob and stud assembly for securing an apertured first member to a second member, said self-locking knob and stud assembly including a stud fixed at one end to the second member and having a shank extending from the second member through the apertured first member, said shank having an externally threaded portion extending a predetermined distance from the second member and a free end portion of substantially Z-shaped in cross-section providing opposed sets of slant L-shaped portions each of which includes a flat chord segment connected to a radial cam segment, a knob having an axial extending bore therethrough, at least one portion of said bore extending from one end of said knob having internal threads in threaded engagement with said threaded portion of said stud to effect attachment of the first member to the second member, said knob having a transverse slot therethrough intersecting said bore adjacent to the opposite end of said knob and, a retainer means, having a return bent spring portion and an integral retainer body portion that is slidably received in said slot, said retainer body portion having a longitudinal extending through slot opening therein through which said free end portion of said shank extends, said slot opening defined by a semi-circular rim edge at one end next adjacent said return bent spring portion of a diameter larger than the outside diameter of said shank so as to slidably and rotatably receive said free end portion of said shank and by an edge means at its other end having a cam tab edge of a size to be in interference relationship with said chord segment and said cam segment, said return bent spring portion abutting against the exterior of said knob to normally bias said retainer body portion in a direction whereby said cam tab edge is positioned to project into said bore so as to be engaged by said chord segment and said cam segment upon rotation of said knob.

2. A self-locking knob and stud assembly for securing together an apertured first member and a second member, including a fastener means fixed to the second member having an externally threaded shank of predetermined axial length extending from the second member to project through the apertured first member that terminates in a free end shank portion of Z-shape in cross section, said Z-shape of said free end shank portion being defined by a set consisting of a substantially flat lock chord segment and a radial cam segment on opposite sides thereof and a self-locking knob including a knob having an axial bore therethrough with at least a portion of said bore having internal threads in threaded engagement with said externally threaded shank, and having a transverse slot therethrough intersecting said bore at a location of said bore receiving said free end shank portion of said fastener means when said knob is fully threaded thereon, and a retainer means having a retainer body slidably received for movement between a first portion and a second portion in said slot and an integral spring means abuting against the exterior of said knob to normally bias said retainer body to said first position in said slot, said retainer body having a longitudinal slot therethrough providing a partial opening defined on one side by a cam tab edge means to slidably receive said free end shank portion when a set of said flat chord segment and of said radial cam segment is substantially aligned with said cam tab edge means when said retainer body is in said first position and providing a full opening to slidably and rotatably receive said free end shank portion when said retainer body is in said second position, said cam tab edge means being operative to engage said radial cam segments to move said retainer body to said second position upon rotation of said knob in one direction relative to said fastener means and to engage one of said flat chord segments upon rotation of said knob in the opposite direction to prevent further rotation of said knob in said opposite direction.

3. A self-locking knob and stud assembly for securing an apertured first member to a second member, said self-locking knob and stud assembly including a fastener means fixed at one end to the second member and having a shank extending from the second member through the apertured first member, said shank having an externally threaded portion extending a predetermined distance from the second member and a free end portion of substantially Z-shaped in cross section providing opposed sets of slant L-shaped portions each of which includes a flat chord segment connected to a radial cam segment and a self-locking knob that includes a knob having an axial extending bore therethrough with at least one portion of said bore that extends from one end of said knob having internal threads in threaded engagement with said threaded portion of said stud to effect attachment of the first member to the second member, said knob having a transverse slot therethrough intersecting said bore adjacent to the opposite end of said knob and, a retainer means, having a return bent spring portion and an integral retainer body portion that is slidably received in said slot for movement between a first position and a second position, said retainer body portion having a longitudinal extending through slot opening therein through which said free end portion of said shank extends, said slot opening being defined by a rim edge means at one end next adjacent said return bent spring portion providing an opening of a diameter larger than the outside diameter of said free end portion of said shank so as to slidably and rotatably receive said free end portion and by an edge means at its other end including a cam tab edge means to provide a partial opening of a size whereby said cam tab edge means will be in interference relationship with said chord segment when said knob is rotated in one direction and with said cam segment when said knob is rotated in the opposite direction, said return bent spring portion abutting against the exterior of said knob to normally bias said retainer body portion to said first position whereby said cam tab edge means is positioned to project into said bore, said opening provided by said rim edge means providing a passage in axial alignment with said bore when said retainer is in said second position.

* * * * *